(12) United States Patent
Kerschbaumer et al.

(10) Patent No.: US 12,451,749 B2
(45) Date of Patent: Oct. 21, 2025

(54) STATOR FOR AN ELECTRICAL MACHINE

(71) Applicant: BRUSA Technology AG, Buchs (CH)

(72) Inventors: Michael Kerschbaumer, Sennwald (CH); Marco Cossale, Sennwald (CH); Daniel Oeschger, Sennwald (CH); Tian Zhou, Sennwald (CH)

(73) Assignee: BRUSA TECHNOLOGY AG, Buchs (CH)

( * ) Notice: Subject to any disclaimer, the term of this patent is extended or adjusted under 35 U.S.C. 154(b) by 102 days.

(21) Appl. No.: 18/010,618

(22) PCT Filed: May 31, 2021

(86) PCT No.: PCT/EP2021/064584
§ 371 (c)(1),
(2) Date: Dec. 15, 2022

(87) PCT Pub. No.: WO2021/254772
PCT Pub. Date: Dec. 23, 2021

(65) Prior Publication Data
US 2023/0299632 A1 Sep. 21, 2023

(30) Foreign Application Priority Data
Jun. 19, 2020 (DE) .............. 10 2020 116 286.3

(51) Int. Cl.
*H02K 3/50* (2006.01)
*H02K 1/16* (2006.01)
*H02K 3/28* (2006.01)

(52) U.S. Cl.
CPC .............. *H02K 3/50* (2013.01); *H02K 1/16* (2013.01); *H02K 3/28* (2013.01)

(58) Field of Classification Search
CPC .............. H02K 3/50; H02K 1/16; H02K 3/28
See application file for complete search history.

(56) References Cited

U.S. PATENT DOCUMENTS

| 1,476,252 A | 12/1923 | Hempel |
| 1,826,296 A | 10/1931 | Apple |

(Continued)

FOREIGN PATENT DOCUMENTS

| DE | 103 21 702 A1 | 1/2004 |
| DE | 10 2012 209 442 A1 | 12/2013 |

(Continued)

OTHER PUBLICATIONS

WO-2018206324-A1_translate (Year: 2018).*

(Continued)

*Primary Examiner* — Tulsidas C Patel
*Assistant Examiner* — Mohammed Ahmed Qureshi
(74) *Attorney, Agent, or Firm* — Hoffmann & Baron, LLP

(57) ABSTRACT

A stator for an n-phase electrical machine includes a plurality of first end connectors of a first connector type arranged to electrically connect first ends of shaped strands arranged in stator slots, and a plurality of second end connectors arranged to electrically connect second ends, thereby forming stator winding sections of the electrical machine. A plurality of further connectors is arranged to connect further first ends and thereby to connect stator winding sections to form at least one of parallel and serial arrangements of stator winding sections. Therein, the further connectors are each manufactured from a piece of sheet metal by cutting and bending, and they each have at least one bridge section in which a surface normal to the original sheet surface is parallel to the machine axis.

20 Claims, 3 Drawing Sheets

(56) References Cited

U.S. PATENT DOCUMENTS

| | | | |
|---|---|---|---|
| 6,958,561 B2 | | 10/2005 | Liao |
| 10,461,588 B2 | * | 10/2019 | Takahashi ............... H02K 3/50 |
| 2009/0295252 A1 | | 12/2009 | Kowalski et al. |
| 2012/0228989 A1 | | 9/2012 | Okimitsu et al. |
| 2014/0197709 A1 | | 7/2014 | Hasegawa |
| 2014/0319960 A1 | | 10/2014 | Iki |
| 2016/0329772 A1 | | 11/2016 | Fukunaga |
| 2018/0097416 A1 | | 4/2018 | Dang |

FOREIGN PATENT DOCUMENTS

| | | | | |
|---|---|---|---|---|
| DE | 10 2017 207 885 A1 | | 11/2018 | |
| DE | 10 2018 105 325 A1 | | 6/2019 | |
| DE | 10 2018 207 224 A1 | | 11/2019 | |
| DE | 10 2018 009 206 B3 | | 3/2020 | |
| JP | 2014-135240 A | | 7/2014 | |
| JP | 2016-13021 A | | 1/2016 | |
| JP | 2019118251 A | * | 7/2019 | ............... H02K 3/28 |
| WO | 01/95461 A1 | | 12/2001 | |
| WO | 2015/060058 A1 | | 4/2015 | |
| WO | WO-2018206324 A1 | * | 11/2018 | ............... H02K 3/12 |
| WO | WO-2020104701 A1 | * | 5/2020 | ......... H02K 15/0068 |

OTHER PUBLICATIONS

WO-2020104701-A1_translate (Year: 2020).*
JP-2019118251-A_translate (Year: 2019).*
German Search Report dated May 19, 2021, Application No. 10 2020 116 286.3; 5 pages.
English-language translation of Notice of Reasons for Rejection issued in Japanese Application No. P2022-576812 on Mar. 25, 2025.

* cited by examiner

STATOR FOR AN ELECTRICAL MACHINE

BACKGROUND OF THE INVENTION

Field of the Invention

The invention relates to a stator for an electrical machine.

Description of Related Art

DE 10201 209 442 A1 discloses flat bars running along the circumference (tangential) and in the radial direction, normal to the bar plane being normal to the machine axis.

U.S. Pat. No. 1,476,252 also shows flat bars running along the circumference (tangential) and in the radial direction, and in the axial direction (that is, with a section of one bar being a different axial region than another section of the same bar) normal to the bar plane being normal to the machine axis.

U.S. Pat. No. 1,826,296 shows the same geometric relations, with the connectors being bent from a piece of sheet metal.

WO 01/95461 shows conductors running along the circumference, with projecting straps bent to run in the axial direction for connecting to the windings.

U.S. Pat. No. 6,958,561 shows connectors shaped along three dimensions (radial/circumferential/axial). They are of a relatively large size, connected with screws to bars constituting the windings.

US 2009/295252 A1 shows a clamping element to connect bar ends.

US 2014/0319960 A1 shows two or more ring-like flat arrangements of conductors laminated together in the axial direction.

SUMMARY OF THE INVENTION

It is an object of the invention to create a stator of the type mentioned initially, which allows for a compact, space saving arrangement of connectors at the axial end face.

A further object can be to provide a stator that allows for insertion of a rotor from both sides of the stator.

The following terms shall be used to specify the geometry of elements.

The axis of rotation of the machine, or simply machine axis, or longitudinal axis of the stator, defines, in each point in space,
- an axial direction, parallel to the axis of rotation or machine axis,
- a radial direction, normal to the axial direction and intersecting the longitudinal axis, and
- a circumferential or tangential direction, normal to the axial direction and normal to the radial directions in this point.

These three directions define a cylindrical coordinate system, and each point in space can be defined by a coordinate value specifying its location along each of these directions.

The stator head volume can be partitioned into separate regions along these directions. For example, an axial region includes all points whose coordinate values in the axial direction lie between a lower and an upper axial boundary value. In the same manner, radial regions and circumferential regions are defined.

The connectors can be manufactured by cutting and bending sheet metal. Techniques such as 'punching' and other forming means of cutting and bending sheet metal are included in this text as equivalent definitions. These metallic connectors can be coated with a layer of electrical insulation.

In each point of the connector an orientation of the connector shall be defined by a vector that is normal to the surface of the connector that was part of the surface of the sheet before cutting and bending. If this point lies in a flat section of the connector, then this flat section extends in a plane that is normal to the orientation of the connector.

A section extending in a direction is understood to refer to directions that are parallel to the surface of the connector that was part of the surface of the sheet before cutting and bending.

The orientation of a flat section of the connector can also be expressed in an equivalent manner in terms of the direction in which the section extends. In general, the orientation of a section being parallel to a certain direction is equivalent to the section extending in directions normal to this direction. In particular,
- the orientation of a section being parallel to the axial direction is equivalent to the section extending in the radial and circumferential direction;
- the orientation of a section being parallel to the radial direction is equivalent to the section extending in the axial direction and in the circumferential direction;
- the orientation of a section being parallel to the circumferential direction is equivalent to the section extending in the axial direction and in the radial direction.

In general, the orientation of a section being in a certain plane is equivalent to the section extending in a first direction within this plane and in a second direction normal to the first direction and normal to the plane.

In particular, the orientation of a section being in a plane normal to the axial direction is equivalent to the section extending in a first direction within this plane and in a second direction parallel to the axial direction.

In operation of the machine, a current will flow through the connector. In a particular section of the connector, the current flows from a first contact region, contacting the section to a first adjacent section, to a second contact region, contacting the section to a second adjacent section. In 3D space, the average direction of the current flow through the section shall be considered to be the direction of the section.

The stator for an n-phase electrical machine, where n is larger than one, includes:
- a first and a second axial end face;
- an inner circumferential surface;
- a machine axis;
- a plurality of stator slots, each stator slot including two or more shaped strands, wherein the shaped strands are arranged in separate layers, inside the stator slots, in at least an inner layer and an outer layer;
- each shaped strand being a stranded conductor and having a first and a second end;
- the first ends of the shaped strands extending from the first axial end face, and the second ends extending from the second axial end face, in each case parallel to the machine axis;
- a plurality of first end connectors of a first connector type being arranged to electrically connect first ends and a plurality of second end connectors being arranged to electrically connect second ends, thereby forming stator winding sections of the electrical machine;
- a plurality of further connectors being arranged to connect first ends and thereby to connect stator winding sections to form at least one of parallel and serial arrangements of stator winding sections.

Therein, the further connectors are each manufactured from at least one piece of sheet metal by cutting and bending, and in that they each include at least one bridge section in which a surface normal to the original sheet surface is parallel to the machine axis, or at an angle of less than 30 degrees, in particular less than 20 degrees, in particular less than 10 degrees to the machine axis.

In other words, the further connectors each include a section in which they, in particular the formerly flat sheet surfaces, extend in directions normal to the machine axis, or at a small angle to directions normal to the machine axis. This in turn allows for the further connectors to be shaped around other connectors at the first end in a space-saving manner.

In embodiments, the further connectors are each manufactured from exactly one piece of sheet metal by cutting and bending.

In embodiments, the further connectors are each manufactured from two or more pieces of sheet metal by cutting and bending. The pieces can be joined by, for example, welding.

In embodiments, the further connectors are arranged to connect stator winding sections of the same phase of the n-phase electrical machine.

In embodiments, the space at the first axial end face can be considered to comprise, starting at the diameter of the circumferential surface and following a radial direction away from the machine axis,
- a ring-shaped contact region in which the first ends of the shaped strands lie and in which the first end connectors are arranged to contact the shaped strands;
- and in which contact region also the first end connectors are arranged to connect the ends of the shaped strands that they are connected to;

Herein the further connectors are shaped to include sections that lie outside the contact region. In particular it can be the bridge section that lies outside the contact region.

In embodiments, the space at the first axial end face can be considered to comprise, starting at the axial end face and following the machine axis,
- first a contact segment in which the first ends of the shaped strands lie and in which the first end connectors are arranged to contact the shaped strands;
- then a first connection segment in which the first end connectors are arranged to connect the ends of the shaped strands that they are connected to.

Herein the further connectors are shaped to include sections that lie outside the first connection segment. In particular it can be the bridge section that lies outside the first connection segment.

A first connection volume can be defined as the intersection of the first connection segment and the contact region. The first connection volume thus is a toroidal volume, having an inner radius and an outer radius. The toroidal volume can be generated by rotating a rectangular cross section around the machine axis.

Thus in general, the further connectors are shaped to include sections that lie outside the first connection volume. In particular it can be the bridge section that lies outside the first connection volume.

In embodiments, the further connectors are arranged to connect two first ends of shaped strands of the inner layer. Although there is little available space between the inner layer and the radius of the inner circumferential surface, the arrangement of the connectors can ensure that room is left for a rotor to be inserted.

In embodiments, the further connectors are arranged to connect two first ends of shaped strands of the outer layer. The arrangement of the connectors can ensure that the outer radius of the connectors is kept small.

In embodiments, the further connectors are arranged each to form a serial arrangement of stator winding sections, in particular wherein a further connector forms a serial arrangement of two stator winding sections, each of these two stator winding sections running once around the circumference of the stator.

In embodiments, the stator includes further connectors of a second type wherein the at least one bridge section is displaced in the radial direction, outwards of a volume in which the first end connectors are arranged.

In embodiments, the further connectors of the second type include:
- a first section forming a connection to a first shaped strand,
- a second section and third section that, starting at the first section, run along the circumferential direction and outwards in the radial direction to
- a fourth section, constituting the bridge section, and from the bridge section run back along the circumferential direction and inwards in the radial direction to a seventh section forming a connection to a second shaped strand.

In embodiments, at least a first and a second further connector of the second type are present, wherein the shaped strands to which the first connector is connected are interleaved with the shaped strands to which the second connector is connected, and wherein the first and second connector cross over one another by the bridge section of the first connector passing around the second connector in the axial direction.

In embodiments, the second section runs along the circumferential direction and outwards in the radial direction, equidistant and adjacent to first end connectors of the first connector type, in particular wherein these first end connectors connect two first ends of shaped strands, one being in the inner layer and one in the outer layer.

In embodiments, the second section and third section form an S-shaped curve which, seen in a projection along the axial direction, passes out of the contact region at a location between two shaped strands.

In embodiments, the shaped strands to which the first connector is connected are interleaved with the shaped strands to which the second connector is connected.

In embodiments, the at least one bridge section is displaced in the axial direction from a volume in which the first end connectors are arranged.

In embodiments, the stator includes further connectors of a third type, each including:
- a first section forming a connection to a first shaped strand,
- a second section, starting at the first section and extending in the axial direction, away from the axial end face,
- a third section, constituting the bridge section, starting at the second section and running along the circumferential direction,
- a fourth section, starting at the third section and extending back in the axial direction towards the axial end face,
- a fifth section, starting at the fourth section and forming a connection to a second shaped strand.

In embodiments, at least a first and a second further connector of the second type are present, wherein the bridge sections of the first and second further connector, seen in a projection along the axial direction, overlap one another, and wherein in each of the first and second further connector each are shaped in the same manner, so as not to collide with one another, The bridge sections not colliding with one another can be achieved by one or both of the bridge sections including two subsections separated by a step in the axial direction, being inclined, with their orientation being at a small angle to the axial direction, in particular at an angle of less than twenty or less than ten degrees.

In embodiments, the stator includes further connectors of a fourth type arranged to connect two first ends of shaped strands, one being in the inner layer and one in the outer layer, and in particular wherein both are in the same stator slot.

In embodiments, the further connectors are arranged each to form a parallel arrangement of stator winding sections, and in particular the parallel arrangement is part of or constitutes a branch of a star configuration of windings.

In embodiments, the further connectors of the fourth type include:

a first section forming a connection to a first shaped strand, a second section, starting at the first section and having its orientation in a plane normal to the axial direction, a third section, constituting the bridge section, starting at the second section and running in the radial direction;

a fourth section, starting at the third section and having its orientation in a plane normal to the axial direction, a fifth section, starting at the fourth section and forming a connection to a second shaped strand.

In embodiments, the further connector includes a contact plate for attaching a conductor for powering the stator, in particular wherein the contact plate is attached to or integrally shaped with the bridge section, and in particular wherein the contact plate extends in the axial direction.

In embodiments, a section forming a connection to a first shaped strand includes two finger sections extending in parallel and forming an electrical connection with the shaped strand, the shaped strand being arranged between the fingers.

BRIEF DESCRIPTION OF THE DRAWINGS

The subject matter of the invention will be explained in more detail in the following text with reference to exemplary embodiments which are illustrated in the attached drawings, which schematically show.

DETAILED DESCRIPTION OF THE INVENTION

In principle, identical or functionally identical parts are provided with the same reference symbols in the figures.

Figure 1:
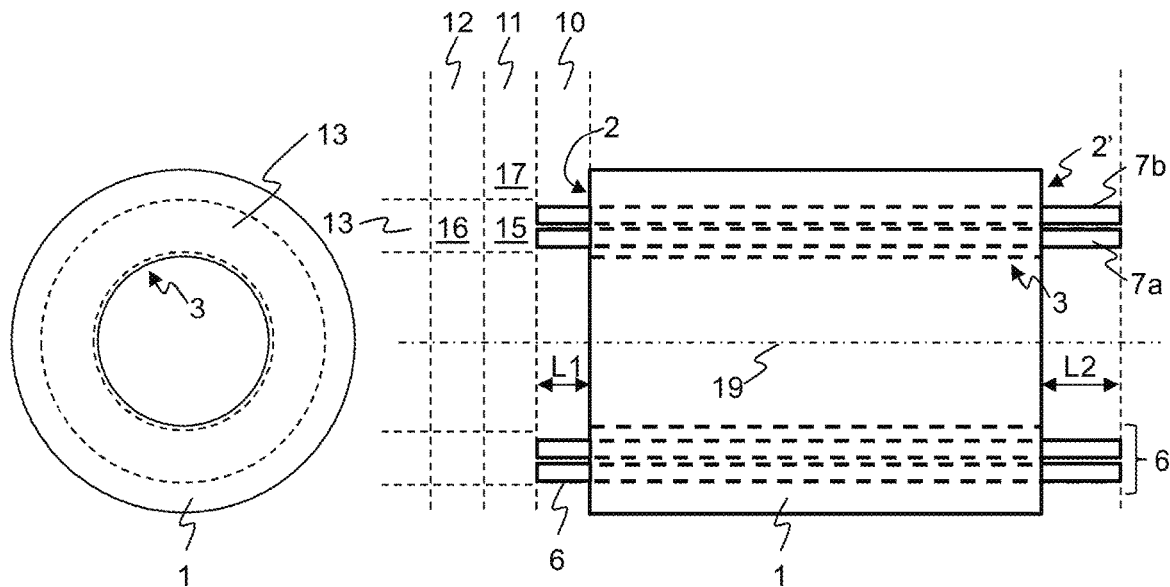
FIG. 1 a stator of an electrical machine.
Figure 2:
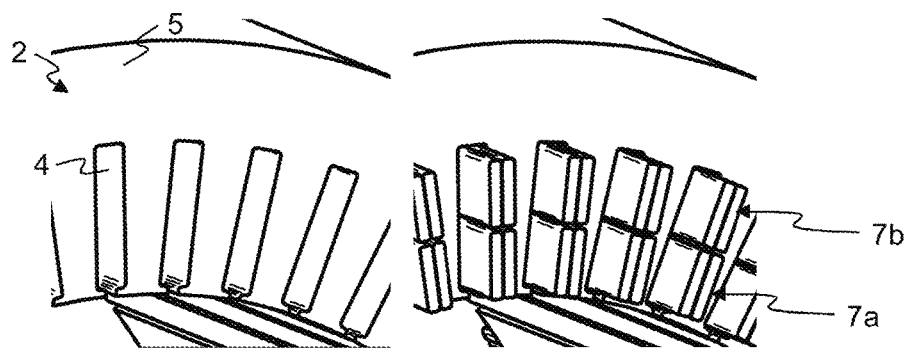
FIG. 2 details of the stator.

FIG. 1 schematically shows a stator 1 of an electrical machine, in a side view and in a front view, as a projection in the direction of a machine axis 19. The stator 1 includes a stator body with two axial end faces 2, 2' and an inner circumferential surface 3. The inner circumferential surface follows the shape of a right circular cylinder whose axis coincides with the stator's axis, and usually has slits separating sections of the surface, the sections forming teeth of the stator separated by stator slots. FIG. 2 shows details on an axial end face 2 of the stator 1. The stator body includes, along its circumference, stator slots 4 connected by a stator yoke 5. In each stator slot 4, two or more shaped strands 6 are arranged, at least in an inner layer 7a and an outer layer 7b. Each of the shaped strands 6 is a stranded conductor, that is, it includes a set of parallel wires, which can be arranged to have a cross section that fills part of the stator slot 4, such as a rectangular or trapezoidal cross section. The parallel wires may also be in a twisted, braided or similarly shaped configuration to fill the above mentioned cross-section. Each shaped strand 6 acts as a separate conductor along the length of the stator 1 in the axial direction. First ends of the shaped strands 6 extend from a first axial end face 2 by a first length L1, and second ends extend from a second axial end face axial end face 2' by a second length L2, in each case parallel to the machine axis 19. Stator windings are created by connections between the first ends and between the second ends. Generally, connections on the second axial end face axial end face 2' are arranged in a simple, regular pattern that allows to keep the connections between the second ends compact. In particular, the connections can be such that the space inside the connections leaves room for a rotor to be inserted into the hollow space in the stator 1, from the side of the second axial end face axial end face 2'.

The connections on the first axial end face 2 on the one hand include a pattern of first type connectors 20 that, together with the connections on the second axial end face 2', form stator winding sections 18. On the other hand, they include further connectors that connect the stator winding section 18 to form, for example, serial and/or parallel connections of stator winding sections 18, which in turn can be connected to form a triangle (commonly known as delta configuration) or star configuration. These further connectors are arranged not to collide with the first type connectors 20, not to collide with one another, and to leave room for the rotor to be inserted into the stator from the side of the first axial end face 2.

Looking at the stator 1 in a projection along the machine axis 19, a ring-shaped region in which the shaped strands 6 and typically also the first and second ends are located, and in which the first type connector 20 extend, shall be called a contact region 13. Looking at the stator 1 in a projection normal to the machine axis 19, a section along the machine axis 19 in which the first ends are located shall be called a contact segment 10;

a further section, outward of the contact segment 10 in the axial direction, in which the first type connectors 20 are arranged, shall be called first connection segment 11;

a further section, outward of the first connection segment 11 in the axial direction, shall be called second connection segment 12.

The intersection of the first connection segment 11 and contact region 13 shall be called first connection volume 15. A volume to the outside of the first connection volume 15, in the radial direction, shall be called outer connection volume 17. A volume to the outside of the first connection volume 15, in the axial direction, shall be called second connection volume 16.

Figure 3:
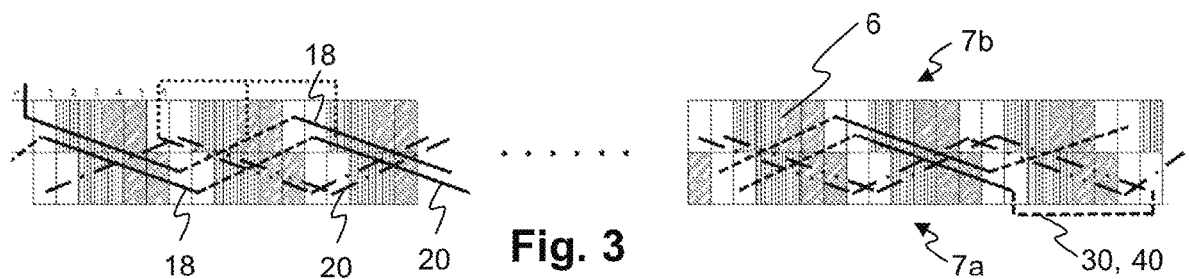
FIGS. 3-4 winding patterns of a stator.
Figure 4:
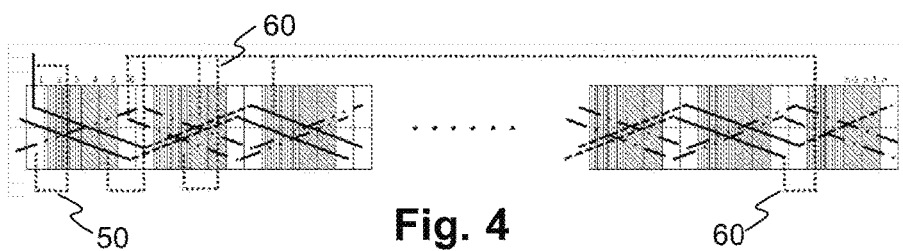

FIGS. 3 and 4 show exemplary winding patterns, with shaped strands 6 of the inner layer 7a and outer layer 7b represented along a line instead of along the circumference of a circle. Each shaped strand 6 is represented by a rectangle, connections of the second ends, effected by first type connectors 20 by dashed lines, and connections of the first ends, effected by first type connectors 20, by continuous lines. The figures show the topology of the electrical connections, not the actual geometric shapes and locations of the connectors. The actual geometric shapes and arrangement of further connectors, described below in detail, is so that they remain outside the diameter of the inner circumferential surface 3.

FIG. 3 schematically shows a further connector, being a second type connector 30 or third type connector 40, arranged to connect two first ends that lie in the inner layer 7a. This can be to create a series connection between two stator winding sections 18.

FIG. 4 schematically shows a further connector, being a fourth type connector 50, arranged to connect two first ends that lie in the inner layer 7a and outer layer 7b, respectively. In this example, they also lie in the same stator slot 4. This can be to create a series parallel connection between two stator winding sections 18, in particular to form one arm of a star arrangement of windings.

FIG. 4 schematically shows a further connector, being a fifth type connector 60, arranged to connect three first ends that lie in the inner layer 7a with one another and with three first ends that lie in the outer layer 7b. This can be to form a star point connecting the arms of a star arrangement.

In the examples of FIGS. 3 and 4, and in other embodiments, the winding patterns can be mirrored, by exchanging, in each slot, the connections to the respective inner and outer layer.

Figure 5:
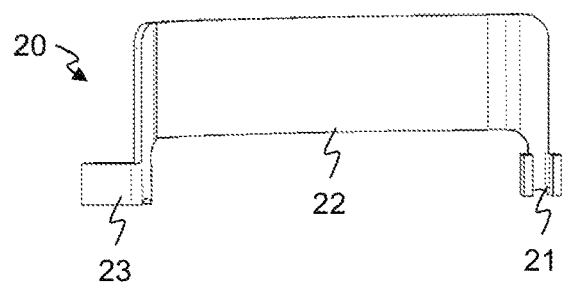
FIG. 5 a first type connector.

FIG. 5 shows a geometry of a first type connector 20. It includes a first section 21 constituting a contact section, for forming a connection to a first or second end of a shaped strand 6. A second section 22 connects the first section 21 to a third section 23, the third section 23 being a contact section for forming a connection to another end of a shaped strand 6. The orientation of the second section 22 lies in a plane normal to the axial direction or machine axis 19. That is, normal vectors on points of a main surface of the second section 22 are parallel to this plane or, in other words, normal to the axial direction. The direction of the second section 22 at least approximately lies in a plane normal to the axial direction. Typically, the second section 22 starting at the first section 21, runs along the circumferential direction and outwards in the radial direction to the third section 23. The first section 21 can be connected to a shaped strand 6 in the inner layer 7a, the third section 23 can be connected to a shaped strand 6 in the outer layer 7b.

Here, as in the other types of connectors, the contact sections 21, 23 can include parallel fingers arranged to contact an end of a shaped strand 6 arranged between the fingers. The contact section and fingers are shaped from a single piece of sheet metal with the other sections of the connector.

Figure 6:
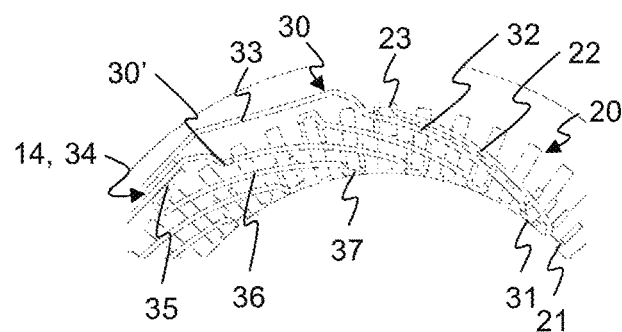
FIG. 6 first type connectors and second type connectors at an axial end face of the stator.
Figure 7:
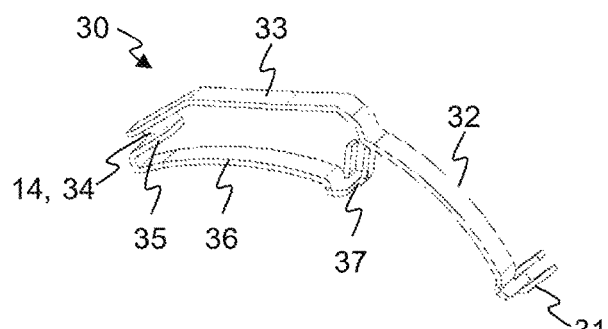
FIG. 7 a second type connector.

FIG. 6 shows such an arrangement of first type connectors 20, together with second type connectors 30 at the first axial end face 2. A single second type connector 30 is shown in FIG. 7. A second type connector 30 connects a first section 31 with a seventh section 37, both being contact sections. Beginning at the first section 31, a second section 32 and third section 33, which can be linked by an s-curved region, run along the circumferential direction and outwards in the radial direction to a fourth section 34 that forms a bridge section 14. From the bridge section 14, a fifth section 35 leads into a sixth section 36 which runs back along the circumferential direction (that is, in a direction opposite to that of the second section 32 and third section 33) and inwards in the radial direction to the seventh section 37.

For the second section 32, third section 33, fifth section 35 and sixth section 36, the orientation lies in a plane normal to the axial direction or machine axis 19, and the direction at least approximately lies in a plane normal to the axial direction. These sections generally also lie within the first connection segment 11, that is, in the same section along the axial direction in which the first type connectors 20 lie. Here, the second sections 32 of the second type connector 30 run essentially equidistant to second sections 22 of adjacent first type connectors 20.

The fourth section 34, being a bridge section 14, lies outside the first connection segment 11, in particular in the contact segment 10. It runs in the radial direction, with its orientation—at least for a small section along the radial direction—being parallel to the axial direction. In this manner, the second type connector 30 passes around a second one of a second type connector 30'. In particular, the bridge section 14 of the first second type connector 30 passes around the third section 33 of the second type connector 30'. The bridge section 14 can have the shape of a C or a U or an L. In this way the two second type connectors 30, 30' can be staggered along the circumference, with their respective contact sections being interleaved. Interleaved means that a contact section of one of the two second type connectors 30, 30' lies between the contact sections of the other one.

Here, as preferably in all embodiments, the thickness of the sheet material of which the connectors are shaped is less than the distance between the inner sides of the ends of the shaped strands 6 and the outer circumference of the rotor that is to be inserted into the stator 1.

Figure 8:
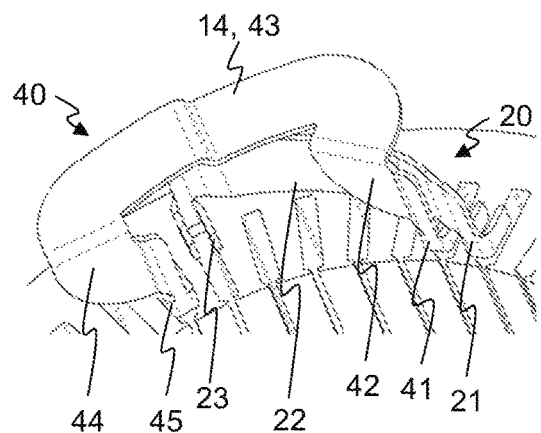
FIG. 8 a first type connector and a third type connector.

FIG. 8 shows an arrangement of first type connectors 20, of which only one is shown, together with one third type connector 40 at the first axial end face 2. As with the second type connector 30, two or more third type connectors 40 can be arranged in a staggered manner, with interleaved contact sections. The contact sections are constituted by a first section 41 and a fifth section 45. From the first section 41, a second section 42 leads to a third section 43 constituting a bridge section 14, and from this a fourth section 44 to the fifth section 45. For the second section 42 and fourth section 44 the orientation lies in a plane normal to the axial direction or machine axis 19, and the direction least in part runs parallel to the axial direction.

By this, the bridge section 14 is located outside the first connection segment 11 in the axial direction, in particular in the second connection segment 12. The bridge section 14 runs along the circumferential direction, with its orientation being parallel to the axial direction. In order for a set of staggered third type connectors 40 not to collide with one another, the bridge section 14 can be inclined with respect to the plane normal to the axial direction (not illustrated), or it can include two subsections at different locations along the axial direction, separated by a step in the axial direction.

Figure 9:
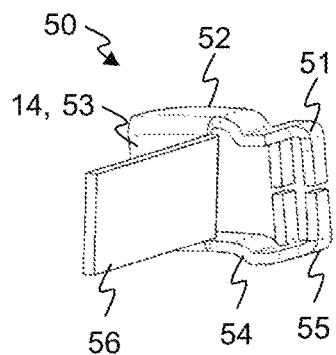
FIGS. 9-10 a fourth type connector.
Figure 10:
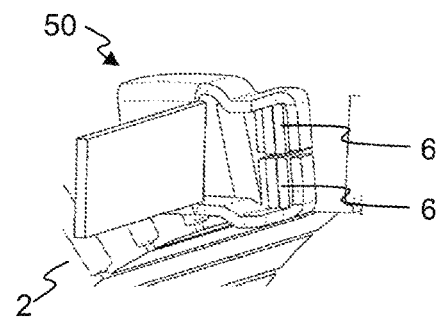

FIGS. 9 and 10 show a fourth type connector 50 alone and connected to shaped strands 6 at an axial end face 2. The contact sections are constituted by a first section 51 and a fifth section 55. From the first section 51, a second section 52 leads to a third section 53 constituting a bridge section 14, and from this a fourth section 54 to the fifth section 55. For the second section 52 and fourth section 54 the orientation lies in a plane normal to the axial direction or machine axis 19, and the direction least in part runs normal to the axial direction, and in part parallel to the axial direction.

By this, the bridge section 14 is located outside the first connection segment 11 in the axial direction, in particular in the second connection segment 12. The bridge section 14 runs along the radial direction, with its orientation being parallel to the axial direction.

The bridge section 14 or third section 53 can be integrally shaped with and connected to a contact plate 56 which allows to electrically connect the fourth type connector 50 to a conductor for powering the stator winding sections 18 connected to the fourth type connector 50.

In each of the embodiments described herein, where the orientation of the bridge section 14 is said to be parallel to the axial direction (that is, a surface normal to the original sheet surface constituting the bridge section 14 is parallel to the machine axis 19), it can be the case that the orientation deviates from the axial direction by a small angle, in particular by an angle of less than 30 degrees, in particular less than 20 degrees, in particular less than 10 degrees.

Figure 11:
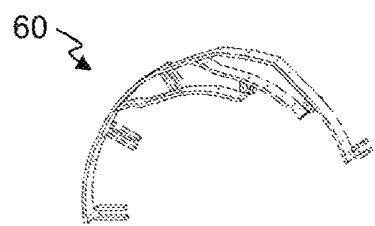
FIGS. 11-12 a fifth type connector.
Figure 12:
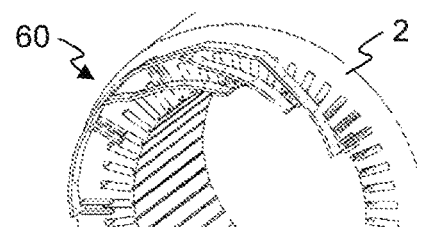

FIGS. 11 and 12 show a fifth type connector 60 alone and connected to shaped strands 6 at an axial end face 2. The fifth type connector 60 includes an elongated section running in the circumferential direction, a first subsection of the elongated section being radially outside the contact region 13, in particular in the outer connection volume 17, and including three contact sections arranged to contact separate stator winding sections 18 at shaped strands 6 in the outer layer 7b. The elongated section further includes three arms, each running in the circumferential direction and inwards in the radial direction to a respective contact section that contacts a corresponding shaped strand 6 in the inner layer 7a. The fifth type connector 60 can serve as a star point connector, as shown in relation to FIG. 4.

Figure 13:
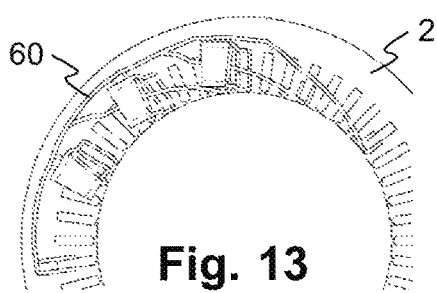
FIG. 13 the fifth type connector in combination with fourth type connectors.

FIG. 13 shows an arrangement of fourth type connectors 50 and a fifth type connector 60 to form a star configuration of stator winding sections 18 as shown in FIG. 4.

Figure 14:
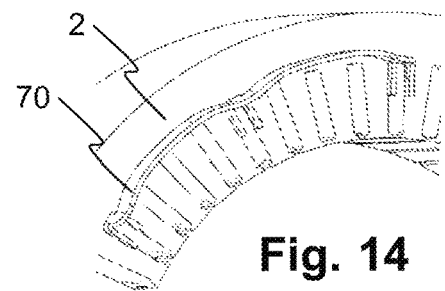
FIG. 14 a further connector.

FIG. 14 shows a sixth type connector 70 connector with an elongated section running in the circumferential direction and being radially outside the contact region 13, in particular in the outer connection volume 17, and including three contact sections arranged to contact separate stator winding sections 18 at shaped strands 6 in the outer layer 7b.

Figure 15:
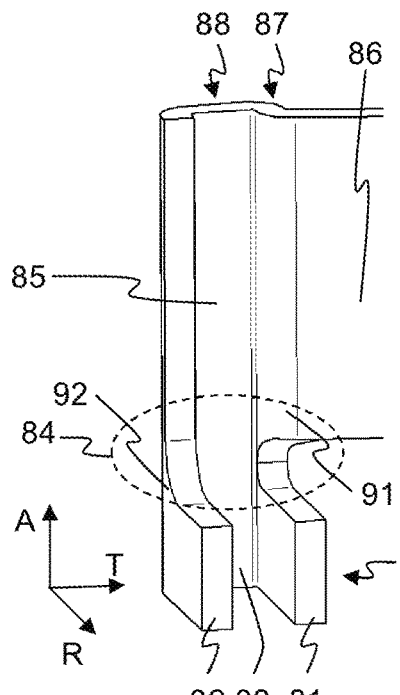
FIGS. 15-17 details of contact sections according to an aspect of the invention.
Figure 16:
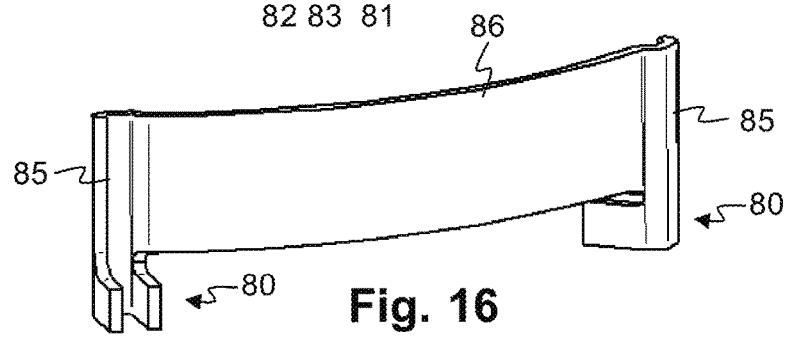
Figure 17:
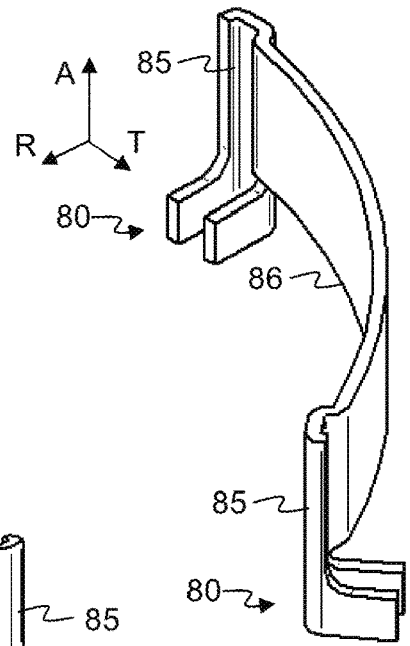

FIGS. 15 to 17 illustrate a detail regarding the shaping of contact sections according to an aspect of the invention. The features according to this aspect can be realised in combination with each of the types of connectors described herein, or independently, with other types of connectors. This aspect addresses issues resulting from the fact that in a contact section the contact fingers extend in the radial direction, enclosing a shaped strand 6, the contact section with the contact fingers lies in the contact segment 10 whereas the other sections of the connector lie outside the contact segment 10 and must be connected to the contact section in the axial direction. There is very little space for this connection due to the closeness of adjacent shaped strands 6 and the requirement not to extend inwards of the inner circumferential surface 3. Consequently, this connection constitutes a necking or constriction conducting area of the connector. Compared to other sections, this connection forms a section of higher resistance, leading to thermal losses. It therefore is necessary to increase or maximise a cross section in this section.

According to this aspect, this is achieved in the following manner, as shown in an exemplary embodiment in FIG. 15: the contact section 80 includes a first finger 81 and second finger 82 joined by a finger base section 83. The first finger 81 and second finger 82 extend in parallel to one another and at least approximately at a right angle to the finger base section 83. A main section 86 of the connector extends in a direction approximately parallel, or at an angle of less than thirty degrees or less than twenty degrees to the orientation of the fingers 81, 82. The main section 86 and the contact section 80 are connected by an intermediate section 85. Where the intermediate section 85 and contact section 80 meet, they form a constriction 84.

When connected to a shaped strand 6, the orientation of the fingers 81, 82 is in the tangential direction T, and the fingers 81, 82 extend in the radial direction R and the axial direction A. The orientation of the finger base section 83 and the intermediate section 85 is in the radial direction R.

In order for the constriction 84 to have a large cross sectional area in the direction of the flow of current through the connector, one or both of the following features are present:
- a first transition section 91 between the intermediate section 85 and the main section 86 is shaped to, beginning at the intermediate section 85, be bent to have the same orientation as the first finger 81, and then to be bent to run into the main section 86. This allows the width of the connector in the constriction 84 to include, on the side of the first transition section 91, a portion of material corresponding to the thickness of the sheet material from which the connector is bent. In more detail, in the first transition section 91, the shape of the connector in a cross sectional view in the axial direction A constitutes an S-curve section 87. The orientation of the connector in this S-curve section 87 is, when connected to a shaped strand 6,
    first in the radial direction R,
    then in the tangential direction T and
    then again in the radial direction R or at or at an angle of less than thirty degrees or less than twenty degrees to the radial direction, thus corresponding to the orientation of the main section 86.
- a second transition section 92 between the intermediate section 85 and the contact section 80 is shaped to, beginning at the intermediate section 85, be bent to have the same orientation as the second finger 82, and then not to run any further in the direction of the second finger 82. This allows the width of the connector in the constriction 84 to include, on the side of the second transition section 92, a portion of material corresponding to the thickness of the sheet material from which the connector is bent. In a region of the constriction 84, the second transition section 92 can include a rounded inner corner at which the second transition section 92 runs into the second finger 82.

If both the first transition section 91 and second transition section 92 as described are present, then the intermediate section 85, in a cross-sectional view in the axial direction A forms a U-shaped section 88.

The increase of width in the constriction 84, described above, is seen when comparing the shape of the constriction 84 in FIG. 15 with corresponding regions in the connectors shown in FIGS. 7-14.

Depending on the embodiment in which the contact section 80 according to this aspect is realised, the main section 86 with regard to its relation to the contact section 80 corresponds to, for example, the second section 32 or sixth section 36 of the second type connector 30, or to the second section 42 or fourth section 44 of the third type connector 40, or to the second section 52 or fourth section 54 of the fourth type connector 50.

FIGS. 16 and 17 show further views of elements according to this further aspect.

While the invention has been described in present embodiments, it is distinctly understood that the invention is not limited thereto, but may be otherwise variously embodied and practised within the scope of the claims.

The invention claimed is:

1. A stator for an n-phase electrical machine, where n is larger than one, the stator comprising:
    a first axial end face and a second axial end face;
    an inner circumferential surface;
    a machine axis;
    a plurality of stator slots, each stator slot comprising two or more shaped strands, wherein the shaped strands are arranged in separate layers inside the stator slots, in at least an inner layer and an outer layer;
    each shaped strand being a stranded conductor and having a first end and a second end;
    first ends of the shaped strands extending from the first axial end face, and second ends extending from the second axial end face, in each case parallel to the machine axis;
    a plurality of first end connectors of a first connector type being arranged to electrically connect the first ends and a plurality of second end connectors being arranged to electrically connect the second ends, thereby forming stator winding sections of the electrical machine;
    a plurality of further connectors being arranged to connect the first ends and thereby to connect stator winding sections to form at least one of parallel and serial arrangements of the stator winding sections, wherein the further connectors are each manufactured from at least one piece of sheet metal by cutting and bending, and in that they each comprise at least one bridge section in which a surface normal to an original sheet surface is at an angle of less than 30 degrees to the machine axis; and
    further connectors of a second type wherein the at least one bridge section is displaced in a radial direction, outwards of a volume in which the first end connectors are arranged, wherein the further connectors of the second type comprise:
        a first section forming a connection to a first shaped strand,
        a second section and third section that, starting at the first section, run along a circumferential direction and outwards in the radial direction to
        a fourth section, constituting the bridge section, and from the bridge section run back along the circumferential direction and inwards in the radial direction to a seventh section forming a connection to a second shaped strand.

2. The stator according to claim 1, wherein the further connectors are arranged to connect two first ends of shaped strands of the inner layer, or are arranged to connect two first ends of shaped strands of the outer layer.

3. The stator according to claim 1, wherein the further connectors are arranged each to form a serial arrangement of stator winding sections, wherein a further connector forms a serial arrangement of two stator winding sections, each of these two stator winding sections running once around a circumference of the stator.

4. The stator according to claim 1, wherein at least a first further connector and a second further connector of the second type are present, wherein the shaped strands to which the first further connector is connected are interleaved with the shaped strands to which the second further connector is connected, and wherein the first further connector and second further connector cross over one another by the bridge section of the first further connector passing around the second further connector in an axial direction.

5. The stator according to claim 1, wherein the second section runs along the circumferential direction and outwards in the radial direction, equidistant and adjacent to first end connectors of the first connector type, and wherein these first end connectors connect two first ends of shaped strands, one being in the inner layer and one in the outer layer.

6. The stator according to claim 1, wherein at least a first further connector and a second further connector of the second type are present,
    wherein bridge sections of the first further connector and the second further connector, seen in a projection along the axial direction, overlap one another, and
    wherein each of the first further connector and second further connector are shaped in a same manner, so as not to collide with one another, and at least one of following conditions:
    comprising two subsections separated by a step in the axial direction, and
    being inclined, with their orientation being at a small angle to the axial direction, the small angle being less than twenty degrees or less than ten degrees.

7. The stator according to claim 1, wherein the further connectors are arranged each to form a parallel arrangement of stator winding sections, wherein the parallel arrangement is part of or constitutes a branch of a star configuration of windings, or of a triangle configuration of windings.

8. The stator according to claim 1, wherein at least one of the further connectors comprises a contact plate to attach a conductor for powering the stator,
    wherein the contact plate is attached to or integrally shaped with the bridge section, and
    wherein the contact plate extends in the axial direction.

9. The stator according to claim 1, wherein a section forming a connection to a first shaped strand comprises two finger sections extending in parallel and forming an electrical connection with the first shaped strand, the first shaped strand being arranged between the two finger sections.

10. A stator for an n-phase electrical machine, where n is larger than one, the stator comprising:
    a first axial end face and a second axial end face;
    an inner circumferential surface;
    a machine axis;
    a plurality of stator slots, each stator slot comprising two or more shaped strands, wherein the shaped strands are arranged in separate layers inside the stator slots, in at least an inner layer and an outer layer;
    each shaped strand being a stranded conductor and having a first end and a second end;

first ends of the shaped strands extending from the first axial end face, and second ends extending from the second axial end face, in each case parallel to the machine axis;

a plurality of first end connectors of a first connector type being arranged to electrically connect the first ends and a plurality of second end connectors being arranged to electrically connect the second ends, thereby forming stator winding sections of the electrical machine;

a plurality of further connectors being arranged to connect the first ends and thereby to connect stator winding sections to form at least one of parallel and serial arrangements of the stator winding sections, wherein the further connectors are each manufactured from at least one piece of sheet metal by cutting and bending, and in that they each comprise at least one bridge section in which a surface normal to an original sheet surface is at an angle of less than 30 degrees to the machine axis, wherein the at least one bridge section is displaced in an axial direction from a volume in which the first end connectors are arranged, and the further connectors are arranged to connect two first ends of shaped strands of the inner layer or are arranged to connect two first ends of shaped strands of the outer layer, and further connectors of a third type, each comprising:
- a first section forming a connection to a first shaped strand,
- a second section, starting at the first section and extending in the axial direction, away from the axial end face,
- a third section, constituting the bridge section, starting at the second section and running along the circumferential direction,
- a fourth section, starting at the third section and extending back in the axial direction towards the axial end face, and
- a fifth section, starting at the fourth section and forming a connection to a second shaped strand.

11. The stator according to claim 10, wherein the further connectors are arranged to connect two first ends of shaped strands of the inner layer, or are arranged to connect two first ends of shaped strands of the outer layer.

12. The stator according to claim 10, wherein the further connectors are arranged each to form a serial arrangement of stator winding sections, wherein a further connector forms a serial arrangement of two stator winding sections, each of these two stator winding sections running once around a circumference of the stator.

13. The stator according to claim 10, wherein the further connectors are arranged each to form a parallel arrangement of stator winding sections, wherein the parallel arrangement is part of or constitutes a branch of a star configuration of windings, or of a triangle configuration of windings.

14. The stator according to claim 10, wherein at least one of the further connectors comprises a contact plate to attach a conductor for powering the stator, wherein the contact plate is attached to or integrally shaped with the bridge section, and wherein the contact plate extends in the axial direction.

15. The stator according to claim 10, wherein a section forming a connection to a first shaped strand comprises two finger sections extending in parallel and forming an electrical connection with the first shaped strand, the first shaped strand being arranged between the two finger sections.

16. A stator for an n-phase electrical machine, where n is larger than one, the stator comprising:
a first axial end face and a second axial end face;
an inner circumferential surface;
a machine axis;
a plurality of stator slots, each stator slot comprising two or more shaped strands, wherein the shaped strands are arranged in separate layers inside the stator slots, in at least an inner layer and an outer layer;
each shaped strand being a stranded conductor and having a first end and a second end;
first ends of the shaped strands extending from the first axial end face, and second ends extending from the second axial end face, in each case parallel to the machine axis;
a plurality of first end connectors of a first connector type being arranged to electrically connect the first ends and a plurality of second end connectors being arranged to electrically connect the second ends, thereby forming stator winding sections of the electrical machine;
a plurality of further connectors being arranged to connect the first ends and thereby to connect stator winding sections to form at least one of parallel and serial arrangements of the stator winding sections, wherein the further connectors are each manufactured from at least one piece of sheet metal by cutting and bending, and in that they each comprise at least one bridge section in which a surface normal to an original sheet surface is at an angle of less than 30 degrees to the machine axis; and
further connectors of a fourth type arranged to connect two first ends of shaped strands, one being in the inner layer and one in the outer layer, and wherein both are in a same stator slot.

17. The stator according to claim 16, wherein the further connectors are arranged each to form a parallel arrangement of stator winding sections, wherein the parallel arrangement is part of or constitutes a branch of a star configuration of windings, or of a triangle configuration of windings.

18. The stator according to claim 16, wherein the further connectors of the fourth type comprise:
- a first section forming a connection to a first shaped strand,
- a second section, starting at the first section and oriented in a plane normal to the axial direction,
- a third section, constituting the bridge section, starting at the second section and running in the radial direction,
- a fourth section, starting at the third section and having its orientation in a plane normal to the axial direction, and
- a fifth section, starting at the fourth section and forming a connection to a second shaped strand.

19. The stator according to claim 16, wherein at least one of the further connectors comprises a contact plate to attach a conductor for powering the stator,
wherein the contact plate is attached to or integrally shaped with the bridge section, and
wherein the contact plate extends in the axial direction.

20. The stator according to claim 16, wherein a section forming a connection to a first shaped strand comprises two finger sections extending in parallel and forming an electrical connection with the first shaped strand, the first shaped strand being arranged between the two finger sections.

* * * * *